J. H. BUTLER.
PLOW HITCH MECHANISM.
APPLICATION FILED MAY 3, 1916.

1,243,704.

Patented Oct. 23, 1917.
2 SHEETS—SHEET 1.

INVENTOR
John H. Butler.
By Adams & Jackson
his Attorneys.

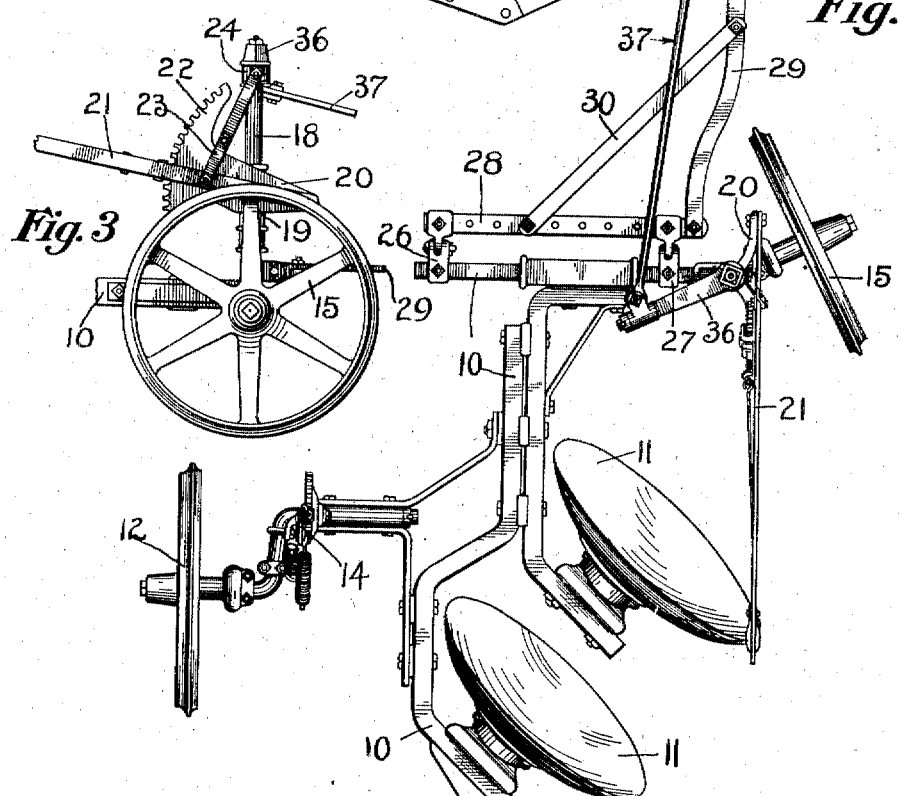

UNITED STATES PATENT OFFICE.

JOHN H. BUTLER, OF DALLAS, TEXAS, ASSIGNOR TO PARLIN & ORENDORFF COMPANY, OF CANTON, ILLINOIS, A CORPORATION OF ILLINOIS.

PLOW-HITCH MECHANISM.

1,243,704.	Specification of Letters Patent.	Patented Oct. 23, 1917.

Application filed May 3, 1916. Serial No. 95,054.

*To all whom it may concern:*

Be it known that I, JOHN H. BUTLER, a citizen of the United States, and a resident of Dallas, in the county of Dallas and State of Texas, have invented a certain new and useful Improvement in Plow-Hitch Mechanisms, of which the following is a specification, reference being had to the accompanying drawings.

This invention relates to plow hitch mechanisms especially designed for connecting a gang plow with a traction engine, and it has for its principal object the provision of automatically-acting means for guiding the plow for maintaining the proper position of the plow relative to the tractor when making a turn, either with the plows in raised position or in operative lowered position. It is one of the objects of my invention to provide means for controlling the position of one or more of the supporting wheels of the frame, such means being preferably adapted for use in connection with hitching means held against transverse movement relative to the plow-frame and pivotally connected upon a vertical axis with the tractor. It is another object of my invention to improve mechanisms of this type in sundry details hereinafter pointed out. The preferred means by which I have accomplished my several objects are illustrated in the drawings and are hereinafter specifically described. That which I believe to be new and desire to cover by this application is set forth in the claim.

In the drawings:—

Fig. 2 is a view similar to Fig. 1, but showing the position of the parts when making a turn;

Fig. 3 is a fragmentary view, being a side view of the forward supporting wheel and the adjacent parts.

Referring to the several figures of the drawings in which corresponding parts are indicated by the same reference characters,—

Figure 4:
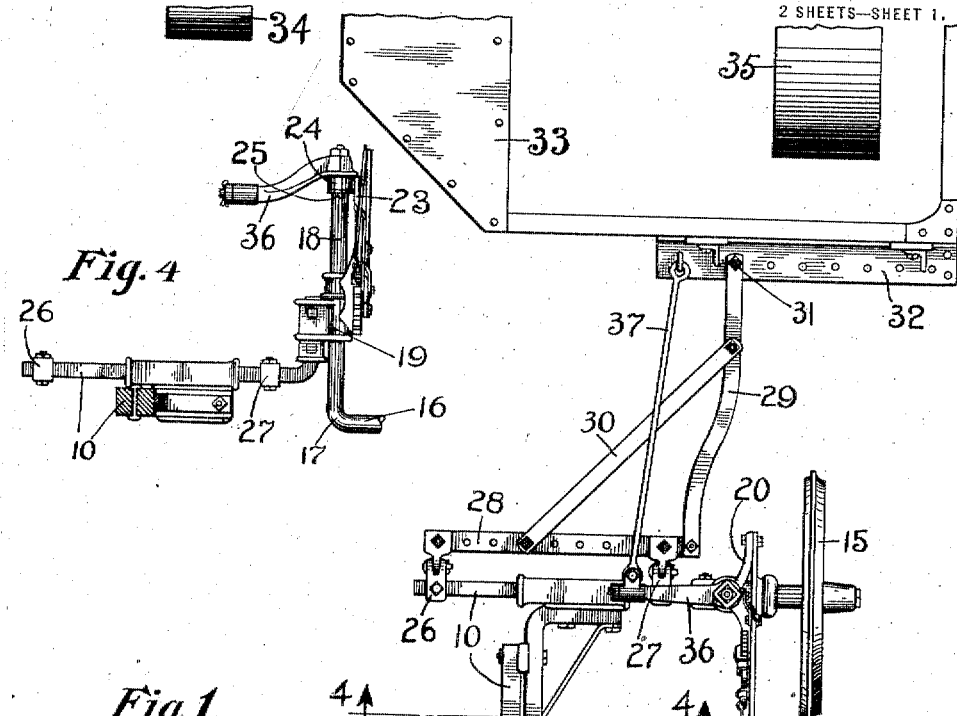
Fig. 4 is a fragmentary view, being substantially a section taken on line 4—4 of Fig. 1.

10 indicates the main framework of the plow, being provided with suitable plow bodies 11, which, in the construction shown, are of a rotary type. Carrying wheels 12—13 are mounted in any suitable manner upon the frame 10, the wheel 12 being adapted to be raised and lowered relative to the frame by means of a lever 14 of any suitable type, and the wheel 13 being preferably adapted to caster freely relative to the frame.

A third supporting wheel 15 is journaled upon a horizontally-extending portion 16 of an axle member 17, a vertically-extending portion 18 of which is journaled in a suitable sleeve 19 carried by the frame 10 relative to which the said portion 18 is adapted to slide vertically. A bracket 20 fixed upon the sleeve 19 has pivotally mounted upon it a lever 21 which is adapted to be set at any desired point along a segmental rack 22 carried by the bracket 21. The lever 21 is connected by means of a link 23 with a collar 24 revolubly mounted upon the upper end of the portion 18 of the axle member 17, a pin 25 being employed for preventing the collar 24 from moving vertically relative to the axle member. As will be readily appreciated from an inspection of Fig. 3, when the lever 21 is raised relative to the bracket 20, the axle member 17 and the wheel 15 will be forced upward relative to the frame 10 and when the lever 21 is lowered the wheel 15 will be lowered relative to the frame, this being accomplished without in any way interfering with the turning laterally of the axle member upon its vertically-extending portion 18.

Clips 26—27 of any suitable type carried by the framework 10 have pivotally connected with their forward ends a transversely-extending bar 28 to which is connected a hitch member comprising a forwardly-extending bar 29 and a diagonally-extending bar 30 which are connected together forward of the bar 28. The hitch member 29—30 is adapted to swing up and down freely upon the pivotal connection between the bar 28 and the frame 10 so as to have a suitable connection with the framework of any suitable traction means. In the construction shown the bar 29 is connected by means of a pivot pin 31 at any desired point along a bar 32 extending transversely of the frame 33 of a traction engine, two of the supporting wheels of which are indicated by 34—35. As will be readily understood, the hitch member 29—30 is held against lateral movement relative to the frame 10 of the plow, and is therefore adapted to maintain the frame 10 of the plow in fixed position transversely of the plow relative to the connection of the hitch member 29—30 with the tractor.

Figure 1:
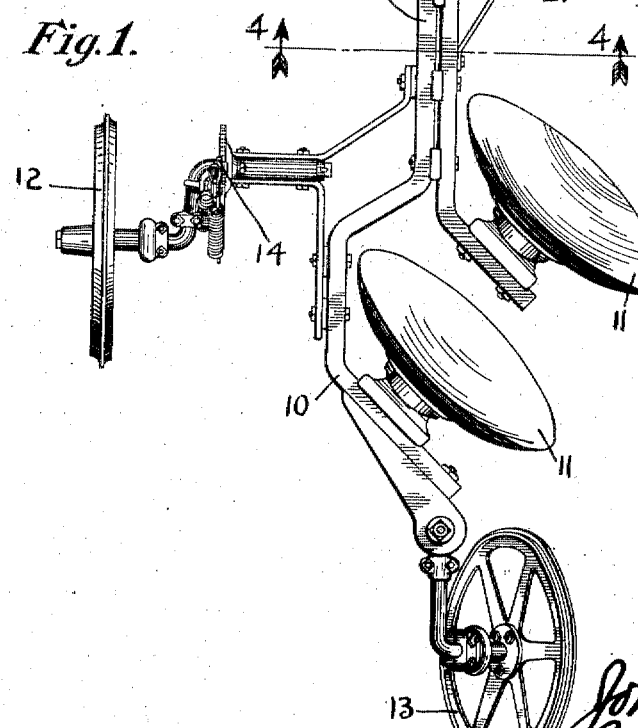
Figure 1 is a top or plan view of a gang plow connected by means of my improved hitch mechanism with a suitable tractor, only a fragmentary portion of the tractor being shown.

In order to turn the supporting wheel 15 laterally for assisting in keeping the frame 10 in proper position relative to the tractor, a connection is provided between the wheel 15 and the traction means. This connecting means comprises an arm 36 rigidly connected with the upper end of the axle member 17 and extending laterally therefrom, and a rigid link 37 pivotally connected at its rear end with the outer end of the arm 36 and pivotally connected at its forward end with the traction means at one side of the point of connection of the hitch member 29—30 thereto. The link 37 is of such a length as to hold the axle member 17 in such position as to keep the wheel 15 in parallelism with the wheel 12 so long as the tractor is going straight forward as shown in Fig. 1. When, however, the link 37 is given a forward or backward movement relative to the hitch member 29—30, the wheel 15 is turned laterally relative to the plow-frame 10. As is shown in Fig. 2, when the tractor inclines to the left, thus giving the link 37 a backward movement relative to the hitch member 29—30 and relative to the frame 10, the wheel 15 is turned laterally into such position as to tend to carry the frame 10 also to the left. As will be readily understood from an inspection of Fig. 2, if the tractor were directed toward the right instead of toward the left as shown in Fig. 2, the hitch member 29—30 would be given a forward movement relative to the hitch member 29—30 and relative to the frame 10 so as to turn the wheel 15 laterally relative to the frame 10 of the plow into such position as to tend to carry the plow-frame 10 to the right.

What I claim as my invention and desire to secure by Letters Patent, is—

The combination of a plow frame comprising a transversely-extending front bar, furrow opening means carried by said frame, a landside wheel journaled on said frame at one side thereof, a furrow wheel journaled on said frame at its opposite side and adapted to be turned laterally relative to the frame, a caster-wheel journaled on said frame in rear of the furrow opening means, a transversely-extending bar pivotally connected at its ends with the front bar of said frame and adapted to swing vertically relative thereto, a hitching member extending forward from said pivotally-mounted bar for connecting said frame to a suitable traction means, a diagonally-extending bar connecting said hitching member with said pivotally-mounted bar adapted to hold the hitching member against lateral movement relative to said pivotally-mounted bar, an arm connected with said second named wheel and extending laterally relative thereto, and a second hitching member pivotally connected with said arm and adapted to be connected to said traction means at one side of the connection of the first-named hitching member thereto adapted, upon an angular movement of the traction means relative to said frame for deflecting the traction means laterally in either direction, to turn said second-named wheel laterally relative to the frame, said hitching members being adapted to maintain said frame in fixed position transversely thereof relative to the point of connection of the hitching members with the traction means.

JOHN H. BUTLER.

It is hereby certified that in Letters Patent No. 1,243,704, granted October 23, 1917, upon the application of John H. Butler, of Dallas, Texas, for an improvement in "Plow-Hitch Mechanisms," an error appears in the printed specification requiring correction as follows: Page 2, line 40, for the reference-numerals "29-30" read 37; and that the said Letters Patent should be read with this correction therein that the same may conform to the record of the case in the Patent Office.

Signed and sealed this 20th day of November, A. D., 1917.

[SEAL.] R. F. WHITEHEAD,

*Acting Commissioner of Patents.*

Cl. 97—73.